(12) United States Patent
Ohta et al.

(10) Patent No.: US 11,536,475 B2
(45) Date of Patent: Dec. 27, 2022

(54) AIR-CONDITIONING SYSTEM INCLUDING A MASTER AND SLAVE CONFIGURATION

(71) Applicant: DAIKIN INDUSTRIES, LTD., Osaka (JP)

(72) Inventors: Shougo Ohta, Osaka (JP); Masaya Nishimura, Osaka (JP); Kousuke Hirai, Osaka (JP); Takayuki Sunayama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 28 days.

(21) Appl. No.: 17/110,499

(22) Filed: Dec. 3, 2020

(65) Prior Publication Data

US 2021/0088240 A1 Mar. 25, 2021

Related U.S. Application Data

(63) Continuation of application No. PCT/JP2019/020232, filed on May 22, 2019.

(30) Foreign Application Priority Data

Jun. 13, 2018 (JP) .............................. JP2018-112840

(51) Int. Cl.
*F24F 11/30* (2018.01)
*F24F 11/64* (2018.01)
(Continued)

(52) U.S. Cl.
CPC ............ *F24F 11/30* (2018.01); *F24F 1/0007* (2013.01); *F24F 1/06* (2013.01); *F24F 11/54* (2018.01);
(Continued)

(58) Field of Classification Search
CPC .. F24F 11/30; F24F 11/64; F24F 11/56; F24F 11/54; F24F 1/0007; F24F 1/06;
(Continued)

(56) References Cited

U.S. PATENT DOCUMENTS

| 2008/0095046 A1* | 4/2008 | Jang ......................... F24F 11/30 |
| | | 370/222 |
| 2015/0128618 A1 | 5/2015 | Park |

(Continued)

FOREIGN PATENT DOCUMENTS

| EP | 1 895 243 A2 | 3/2008 |
| EP | 2 581 676 A2 | 4/2013 |

(Continued)

OTHER PUBLICATIONS

International Search Report (PCT/ISA/210) issued in PCT/JP2019/020232 dated Aug. 6, 2019.

(Continued)

*Primary Examiner* — Alicia M. Choi
(74) *Attorney, Agent, or Firm* — Birch, Stewart, Kolasch & Birch, LLP

(57) ABSTRACT

Internal control devices (41A to 41D) included respectively in air conditioners (10A to 10D) in an air conditioning system (1) are communicably connected one by one correspondingly to external control devices (42A to 42D). Each of the external control devices (42A to 42D) is configured to execute command generating operation of generating an operation command to a corresponding one of the air conditioners (10A to 10D). The external control devices (42A to 42D) constitute an external control system (50). In the external control system (50), one of the external control devices (42A) functions as a master control device configured to execute the command generating operation whereas remaining ones of the external control devices (42A to 42D)

(Continued)

other than the external control device (42A) functioning as the master control device function as sub control devices configured not to execute the command generating operation.

6 Claims, 5 Drawing Sheets

(51) Int. Cl.
    *F24F 11/56*     (2018.01)
    *F24F 11/54*     (2018.01)
    *F24F 1/0007*     (2019.01)
    *F24F 1/06*     (2011.01)
    *F24F 13/00*     (2006.01)
    *G05B 19/042*     (2006.01)
    *F24F 140/00*     (2018.01)

(52) U.S. Cl.
    CPC ............... *F24F 11/56* (2018.01); *F24F 11/64* (2018.01); *F24F 13/00* (2013.01); *G05B 19/042* (2013.01); *F24F 2140/00* (2018.01); *G05B 2219/2614* (2013.01)

(58) Field of Classification Search
    CPC ........ F24F 13/00; F24F 2140/00; F24F 11/02; G05B 19/042; G05B 2219/2614; G05B 15/02
    See application file for complete search history.

(56) References Cited

U.S. PATENT DOCUMENTS

| | | | |
|---|---|---|---|
| 2017/0023271 A1 | 1/2017 | Nabeshima et al. | |
| 2018/0225244 A1* | 8/2018 | Dorneanu | ............. G06F 13/374 |
| 2018/0356115 A1* | 12/2018 | Koizumi | .................. F24F 11/62 |
| 2019/0207810 A1* | 7/2019 | Seely | .................... H04L 41/082 |
| 2020/0050161 A1* | 2/2020 | Noboa | ..................... F24F 11/32 |

FOREIGN PATENT DOCUMENTS

| | | | | |
|---|---|---|---|---|
| JP | 2011-58743 A | | 3/2011 | |
| JP | 2011058743 A | * | 3/2011 | |
| JP | 2015-105799 A | | 6/2015 | |
| JP | 2015105799 A | * | 6/2015 | ............. F24F 11/30 |
| JP | 2017-48962 A | | 3/2017 | |

OTHER PUBLICATIONS

Extended European Search Report for European Application No. 19819175.1, dated Feb. 3, 2022.

\* cited by examiner

AIR-CONDITIONING SYSTEM INCLUDING A MASTER AND SLAVE CONFIGURATION

CROSS REFERENCE TO RELATED APPLICATIONS

This application is a Continuation of PCT International Application PCT/JP2019/020232 filed on May 22, 2019, which claims priority under 35 U.S.C. § 119(a) to Patent Application No. 2018-112840 filed in Japan on Jun. 13, 2018, all of which are hereby expressly incorporated by reference into the present application.

TECHNICAL FIELD

The present disclosure relates to an air conditioning system.

BACKGROUND ART

Patent Literature 1 discloses an air conditioning system including a plurality of air conditioners and a plurality of control apparatuses. One control apparatus included in the air conditioning system is configured to communicate with outdoor units and indoor units in the plurality of air conditioners by means of wireless or wired communication. The control apparatus controls the plurality of air conditioners.

CITATION LIST

Patent Literature

[Patent Literature 1] JP 2017-48962 A

SUMMARY

The present disclosure provides a first aspect relating to an air conditioning system (1). The air conditioning system (1) according to this aspect includes: a plurality of air conditioners (10A to 10D) each including a refrigerant circuit (20) configured to achieve a refrigeration cycle and a corresponding one of internal control devices (41A to 41D) configured to control operation, and external control devices (42A to 42D) provided one by one correspondingly to the plurality of air conditioners (10A to 10D) and each communicably connected to one of the internal control devices (41A to 41D) in a corresponding one of the air conditioners (10A to 10D); in which each of the external control devices (42A to 42D) is configured to execute command generating operation of individually generating an operation command to the corresponding one of the air conditioners (10A to 10D), each of the internal control devices (41A to 41D) in the air conditioners (10A to 10D) is configured to control operation of the corresponding one of the air conditioners (10A to 10D) in accordance with the operation command received from one of the external control devices (42A to 42D) connected to the one of the internal control devices (41A to 41D), the plurality of external control devices (42A to 42D) is configured to communicate with each other to constitute an external control system (50), the external control system (50) is configured to cause one of the external control devices (42A to 42D) to function as a master control device configured to execute the command generating operation and transmit the operation command generated through the command generating operation to the one of the internal control devices (41A to 41D) in the corresponding one of the air conditioners (10A to 10D) and remaining ones of the external control devices (42A to 42D), and cause the remaining ones of the external control devices (42A to 42D) other than the one of the external control devices (42A to 42D) functioning as the master control device to function as sub control devices each configured to, without executing the command generating operation, transmit the operation command received from the one of the external control devices (42A to 42D) functioning as the master control device to the one of the internal control devices (41A to 41D) in the corresponding air conditioner.

DESCRIPTION OF EMBODIMENTS

An air conditioning system (1) according to an embodiment will now be described in detail with reference to the drawings.

Configuration of Air Conditioning System

Figure 1:
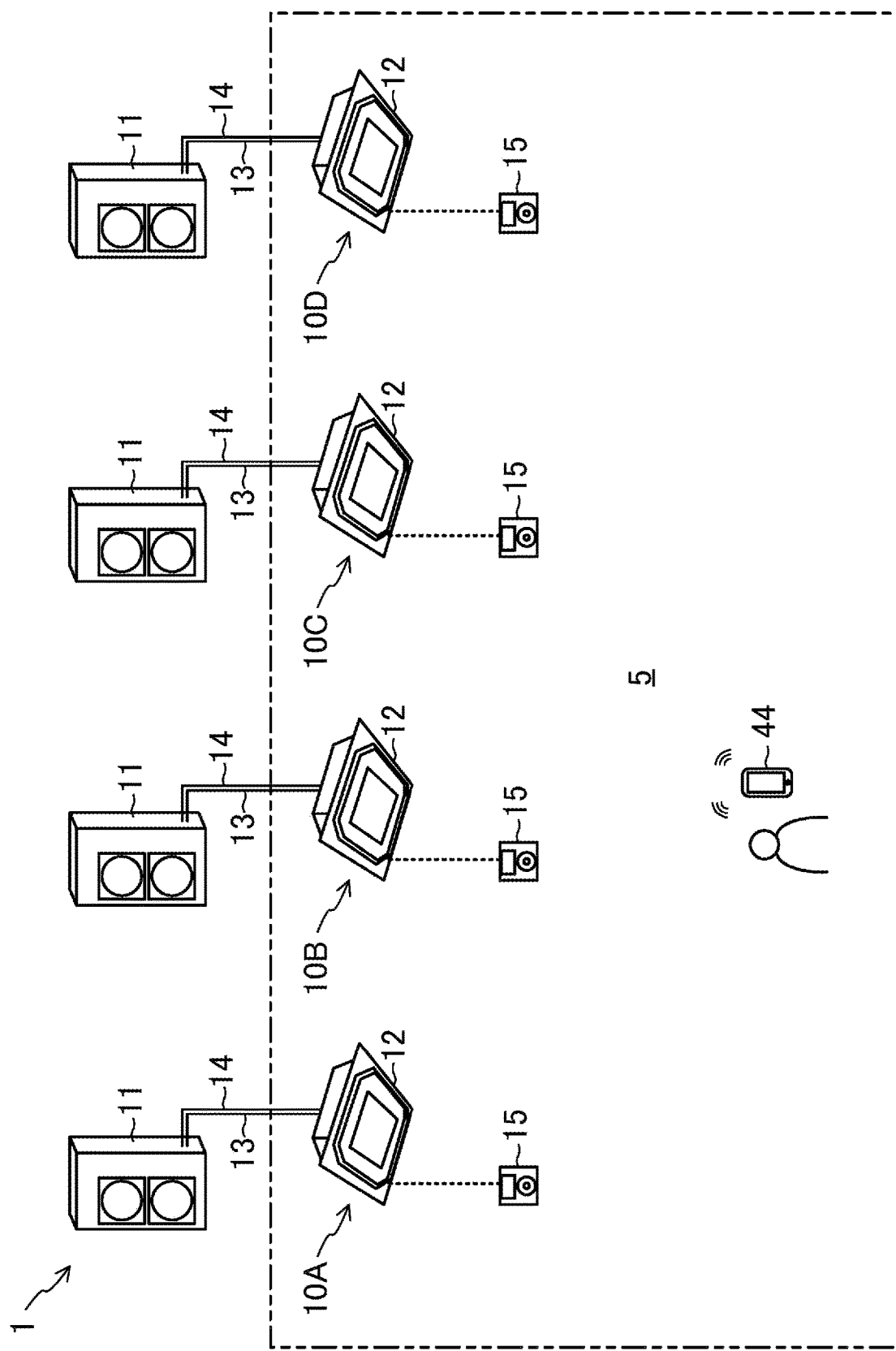
FIG. 1 is a schematic overall configuration diagram of an air conditioning system according to an embodiment.

As depicted in FIG. 1, the air conditioning system (1) according to the present embodiment includes four air conditioners (10A to 10D). The air conditioning system (1) has only to include two or more air conditioners (10A to 10D) and does not necessarily include four air conditioners.

As to be described in detail later, the air conditioners (10A to 10D) in the air conditioning system (1) each include an outdoor unit (11) and an indoor unit (12). The air conditioners (10A to 10D) condition air in an identical indoor space (5). The air conditioning system (1) is configured to achieve cooperative operation with the plurality of air conditioners (10A to 10D) cooperatively conditioning air in the indoor space (5). Such cooperative operation will be described later.

Basic Configuration of Air Conditioner

The air conditioners (10A to 10D) included in the air conditioning system (1) are configured identically. The air conditioners (10A to 10D) are of a so-called paired type. The air conditioners (10A to 10D) each include the single outdoor unit (11) and the single indoor unit (12). Each of the air conditioners (10A to 10D) may alternatively include a plurality of indoor units (12).

The outdoor unit (11) is disposed outside. The indoor unit (12) is configured to be installed at a ceiling and is disposed in the indoor space (5). The indoor unit (12) in each of the air conditioners (10A to 10D) sucks air from the identical indoor space (5) and blows out air into the identical indoor space (5). The indoor unit (12) may be configured to be hung on a wall or be stood on a floor. The outdoor unit (11) and the indoor unit (12) in each of the air conditioners (10A to 10D) are connected to each other by a pair of connection pipes (13 and 14).

Each of the air conditioners (10A to 10D) includes a remote controller (15). The remote controller (15) is provided with an operation button operated by a user to change set temperature and an operating mode, and a display unit configured to display an operating state of the corresponding one of the air conditioners (10A to 10D).

Configuration of Refrigerant Circuit and Constituent Devices of Air Conditioner

Figure 2:
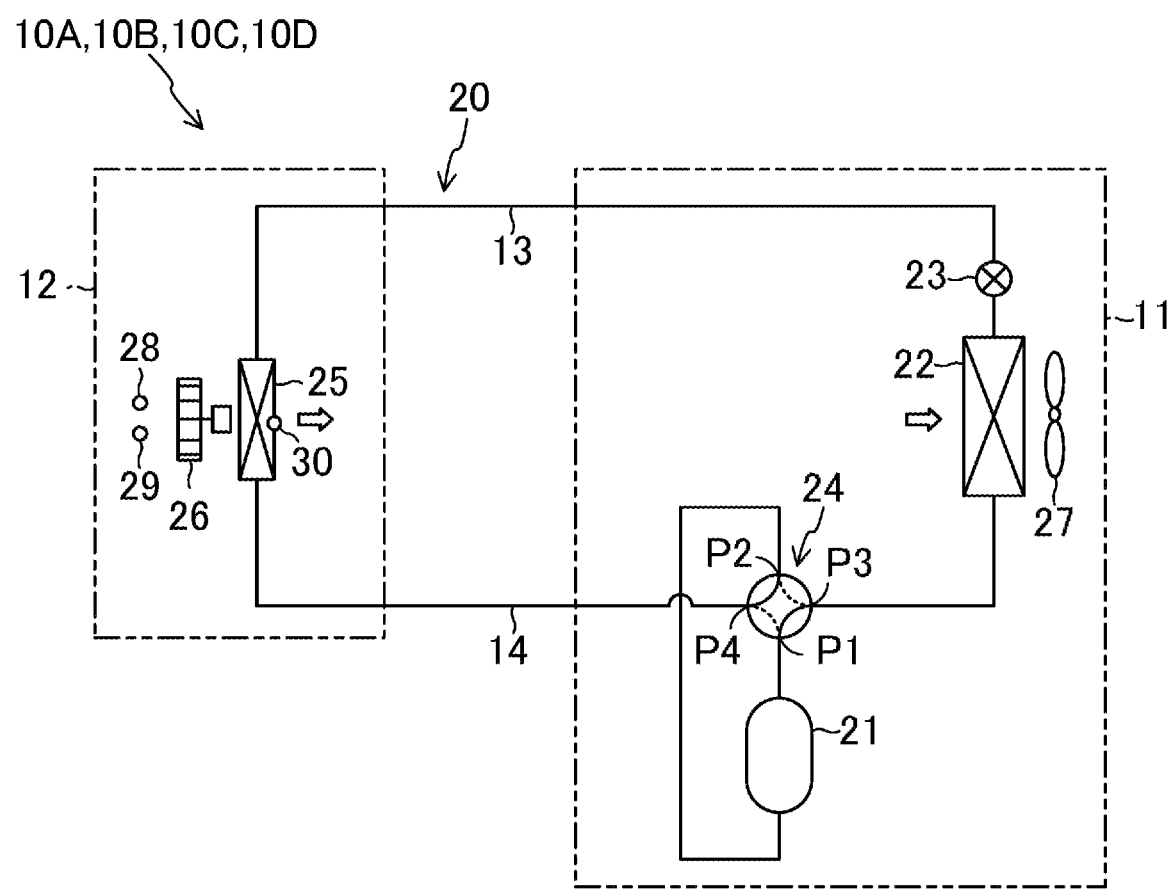
FIG. 2 is a schematic piping diagram of a first air conditioner and a second air conditioner in the air conditioning system according to the embodiment.

As depicted in FIG. 2, the outdoor unit (11) and the indoor unit (12) in each of the air conditioners (10A to 10D) are connected to each other by the pair of connection pipes (13 and 14) to constitute a refrigerant circuit (20). The refrigerant circuit (20) is filled with a refrigerant that circulates to achieve a vapor compression refrigeration cycle.

The refrigerant circuit (20) is provided with a compressor (21), an outdoor heat exchanger (22), an expansion valve (23), a four-way switching valve (24), and an indoor heat exchanger (25). The outdoor unit (11) accommodates the compressor (21), the outdoor heat exchanger (22), the expansion valve (23), and the four-way switching valve (24). The indoor unit (12) accommodates the indoor heat exchanger (25).

The compressor (21) has variable operating capacity. The compressor (21) is supplied with AC power from an inverter device not depicted. The inverter device has an output frequency (an operation frequency of the compressor (21)), variation in which leads to variation in rotational speed of the compressor (21) and eventually variation in operating capacity of the compressor (21).

The four-way switching valve (24) has first to fourth ports (P1, P2, P3, P4). The first port (P1) communicates with a discharge side of the compressor (21), the second port (P2) communicates with a suction side of the compressor (21), the third port (P3) communicates with a gas side end of the outdoor heat exchanger (22), and the fourth port (P4) communicates with a gas side end of the indoor heat exchanger (25) via the connection pipe (14). The four-way switching valve (24) switches between a first state (indicated by a solid line in FIG. 2) and a second state (indicated by broken lines in FIG. 2). In the first state, the first port (P1) and the third port (P3) communicate with each other while the second port (P2) and the fourth port (P4) communicate with each other. In the second state, the first port (P1) and the fourth port (P4) communicate with each other while the second port (P2) and the third port (P3) communicate with each other.

The outdoor heat exchanger (22) is exemplarily of a fin and tube type. The outdoor heat exchanger (22) has a liquid side end connected to a first end of the connection pipe (13) via the expansion valve (23). The outdoor heat exchanger (22) is adjacent to an outdoor fan (26). The outdoor heat exchanger (22) exchanges heat between a refrigerant and outdoor air blown by the outdoor fan (26). The expansion valve (23) is configured as an electronic expansion valve having a variable opening degree.

The indoor heat exchanger (25) is exemplarily of a fin and tube type. The indoor heat exchanger (25) has a liquid side end connected to a second end of the connection pipe (13). The indoor heat exchanger (25) is adjacent to an indoor fan (27). The indoor heat exchanger (25) exchanges heat between a refrigerant and indoor air blown by the indoor fan (27). The indoor unit (12) supplies the indoor space (5) with blown air that has passed the indoor heat exchanger (25).

The indoor heat exchanger (25) is provided with a refrigerant temperature sensor (30). The refrigerant temperature sensor (30) detects temperature of a refrigerant flowing in the indoor heat exchanger (25). The refrigerant temperature sensor has a detection value transmitted to the corresponding one of the internal control devices (41A to 41D) to be described later, as evaporation temperature or condensation temperature of the refrigerant in the indoor heat exchanger.

The indoor unit (12) in each of the air conditioners (10A to 10D) is provided with a suction temperature sensor (28) and a suction humidity sensor (29). The suction temperature sensor (28) detects, as suction temperature (Th1), temperature of air sucked into the indoor unit (12) and delivered to the indoor heat exchanger (25). The suction humidity sensor (29) detects, as suction humidity (Rh1), humidity (strictly, relative humidity) of air sucked into the indoor unit (12) and delivered to the indoor heat exchanger (25).

Configuration of Control Apparatus

Figure 3:
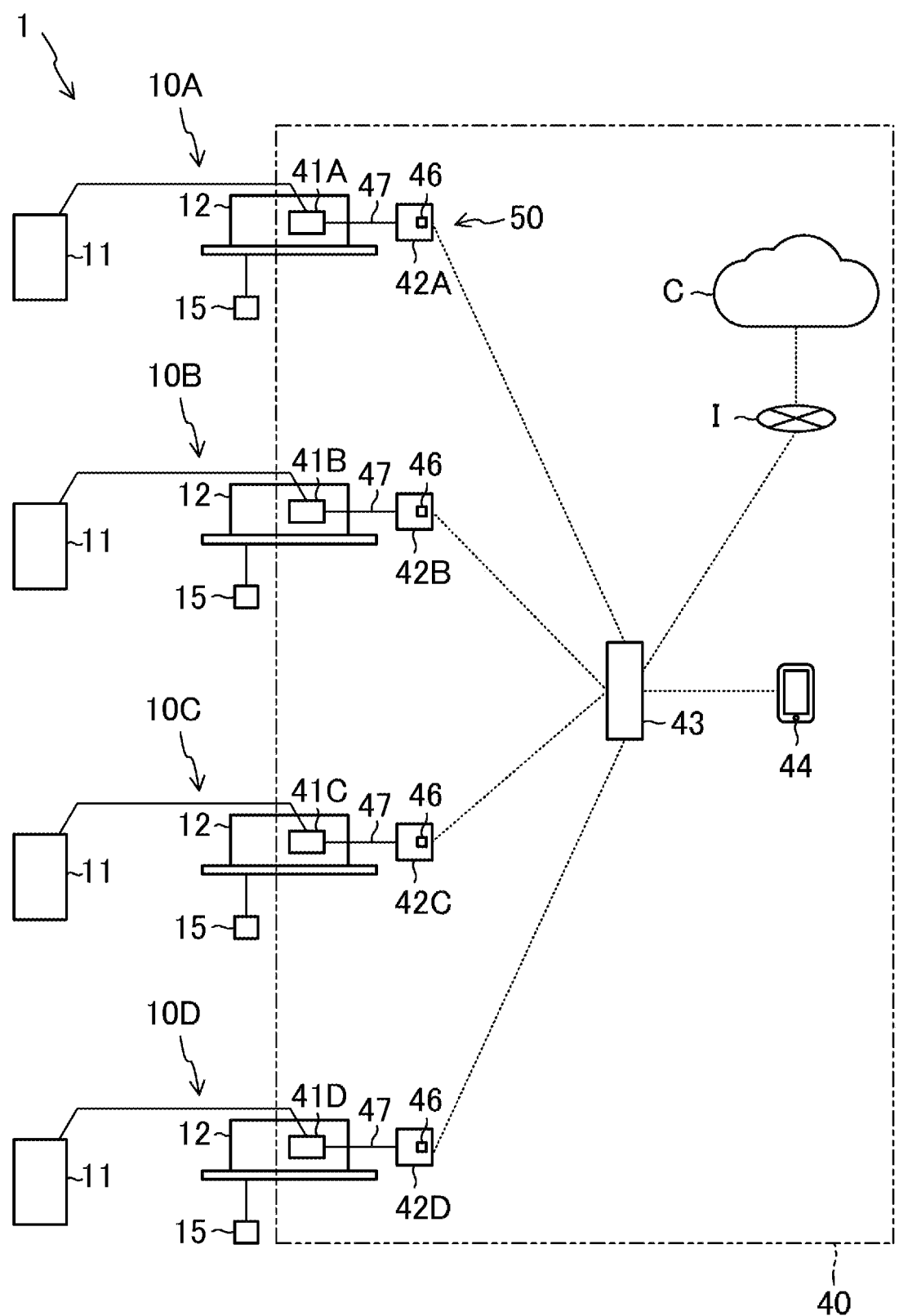
FIG. 3 is a block diagram of the air conditioning system according to the embodiment.

As depicted in FIG. 3, the air conditioning system (1) includes a control apparatus (40) configured to control the air conditioners (10A to 10D). The control apparatus (40) includes the internal control devices (41A to 41D) and external control devices (42A to 42D) equal in the number (four in the present embodiment) to the air conditioners (10A to 10D). The control apparatus (40) includes a wireless router (43) and a communication terminal (44).

Internal Control Device

The internal control devices (41A to 41D) are provided one by one correspondingly to the air conditioners (10A to 10D). Specifically, the first internal control device (41A) is provided in the first air conditioner (10A), the second internal control device (41B) is provided in the second air conditioner (10B), the third internal control device (41C) is provided in the third air conditioner (10C), and the fourth internal control device (41D) is provided in the fourth air conditioner (10D).

Though not depicted, each of the internal control devices (41A to 41D) includes a processor (e.g. a microcontroller) and a memory device (e.g. a semiconductor memory) that stores software configured to operate the processor. The memory device also stores data necessary for control operation of the corresponding one of the internal control devices (41A to 41D).

Each of the internal control devices (41A to 41D) is configured to control the constituent devices (specifically, the compressor (21), the four-way switching valve (24), the expansion valve (23), the outdoor fan (26), the indoor fan (27), and the like) in the corresponding one of the air conditioners (10A to 10D). Specifically, the first internal control device (41A) controls the constituent devices in the first air conditioner (10A), the second internal control device (41B) controls the constituent devices in the second air conditioner (10B), the third internal control device (41C) controls the constituent devices in the third air conditioner (10C), and the fourth internal control device (41D) controls the constituent devices in the fourth air conditioner (10D). During cooperative operation, each of the internal control devices (41A to 41D) is configured to control the constituent devices in the corresponding one of the air conditioners (10A to 10D) in accordance with an operation command transmitted from the corresponding one of the external control devices (42A to 42D).

External Control Device

The external control devices (42A to 42D) are provided one by one correspondingly to the air conditioners (10A to 10D). Each of the external control devices (42A to 42D) is communicably connected, via a communication cable (47), to the one of the internal control devices (41A to 41D) provided in the corresponding one of the air conditioners (10A to 10D). Specifically, the first external control device (42A) is connected to the first internal control device (41A), the second external control device (42B) is connected to the second internal control device (41B), the third external control device (42C) is connected to the third internal control device (41C), and the fourth external control device (42D) is connected to the fourth internal control device (41D).

Though not depicted, each of the external control devices (42A to 42D) includes a processor (e.g. a microcontroller) and a memory device (e.g. a semiconductor memory) that stores software configured to operate the processor. The memory device also stores data necessary for control operation of the corresponding one of the external control devices (42A to 42D).

Each of the external control devices (42A to 42D) stores a unique identification number. According to the present embodiment, the first external control device (42A) stores an identification number "1", the second external control device (42B) stores an identification number "2", the third external control device (42C) stores an identification number "3", and the fourth external control device (42D) stores an identification number "4".

Each of the external control devices (42A to 42D) includes a communication unit (46) configured to wirelessly communicate with the wireless router (43), and also functions as a wireless LAN adapter. Each of the external control devices (42A to 42D) wirelessly communicates with the remaining ones of the external control devices (42A to 42D) via the wireless router (43). The external control devices (42A to 42D) are communicably connected to each other and constitute an external control system (50).

Figure 4:
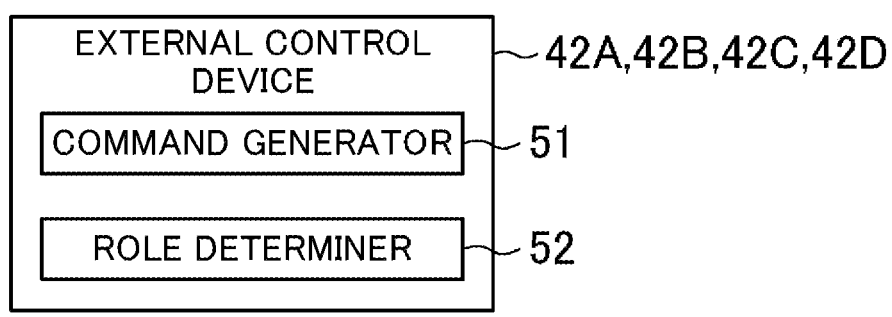
FIG. 4 is a block diagram depicting a configuration of an external control device.

As depicted in FIG. 4, the external control devices (42A to 42D) each include a command generator (51) and a role determiner (52). The command generator (51) is configured to execute command generating operation. Such command generating operation includes generating, individually for the air conditioners (10A to 10D), operation commands necessary for operation control of all of the air conditioners (10A to 10D) as cooperative operation targets. All the external control devices (42A to 42D) in the air conditioning system (1) are configured to execute operation causing the air conditioning system (1) to execute cooperative operation. The role determiner (52) is configured to determine whether the one of the external control devices (42A to 42D) including the role determiner (52) functions as a master control device or a sub control device to be described later.

Each of the external control devices (42A to 42D) may be installed inside or outside the corresponding one of the air conditioners (10A to 10D). When each of the external control devices (42A to 42D) is installed inside the corresponding one of the air conditioners (10A to 10D), the processor and the memory device constituting the corresponding one of the external control devices (42A to 42D) may be provided at a printed circuit board provided with the processor and the memory device constituting the corresponding one of the internal control devices (41A to 41D).

Wireless Router

The wireless router (43) is connected to a cloud server (C) via an Internet (I). Upon updating the software in the corresponding one of the internal control devices (41A to 41D) or the external control devices (42A to 42D), updated software is transmitted from the cloud server (C) to the corresponding one of the internal control devices (41A to 41D) or the external control devices (42A to 42D) via the Internet (I) and the wireless router (43).

Communication Terminal

The communication terminal (44) is constituted by a smartphone, a tablet PC, or the like. The communication terminal (44) includes application software configured to display an operating state of the air conditioning system (1) and used by the user to input an operation command to the air conditioning system (1). The communication terminal (44) wirelessly communicates with the external control devices (42A to 42D) via the wireless router (43).

Operation of Air Conditioning System

The air conditioning system (1) is configured to execute noncooperative operation with the plurality of air conditioners (10A to 10D) independently conditioning air in the indoor space (5) and cooperative operation with the plurality of air conditioners (10A to 10D) cooperatively conditioning air in the indoor space (5). The air conditioners (10A to 10D) are each configured to execute cooling operation and heating operation.

Cooling Operation of Air Conditioner

Description is made to cooling operation of each of the air conditioners (10A to 10D). During cooling operation, the four-way switching valve (24) is set into the first state, the outdoor heat exchanger (22) functions as a condenser, and the indoor heat exchanger (25) functions as an evaporator. In each of the air conditioners (10A to 10D) executing cooling operation, the corresponding one of the internal control devices (41A to 41D) adjusts operating capacity of the compressor (21) such that the evaporation temperature of the refrigerant (specifically, the detection value of the refrigerant temperature sensor (30)) in the indoor heat exchanger (25) reaches target evaporation temperature.

Heating Operation of Air Conditioner

Description is made to heating operation of each of the air conditioners (10A to 10D). During heating operation, the four-way switching valve (24) is set into the second state, the indoor heat exchanger (25) functions as a condenser, and the outdoor heat exchanger (22) functions as an evaporator. In each of the air conditioners (10A to 10D) executing heating operation, the corresponding one of the internal control devices (41A to 41D) adjusts operating capacity of the compressor (21) such that the condensation temperature of the refrigerant (specifically, the detection value of the refrigerant temperature sensor (30)) in the indoor heat exchanger (25) reaches target condensation temperature.

Cooperative Operation of Air Conditioning System

Description is made to cooperative operation of the air conditioning system (1). During such cooperative operation, the plurality of air conditioners (10A to 10D) provided in the air conditioning system (1) operates cooperatively to cause temperature and humidity (relative humidity) in the indoor space (5) to reach set values.

Cooperative operation can be achieved in a state where the air conditioners (10A to 10D) in the air conditioning system (1) execute cooling operation. During cooperative operation, the air conditioners (10A to 10D) ordinarily include at least one functioning as a latent heat processor and at least one functioning as a sensible heat processor. In the at least one of the air conditioners (10A to 10D) functioning as a latent heat processor, the evaporation temperature of the refrigerant has a target value set to be lower than dew point temperature of indoor air, and the air conditioner cools as well as dehumidifies the indoor air. In the at least one of the air conditioners (10A to 10D) functioning as a sensible heat processor, the evaporation temperature of the refrigerant has a target value set to be equal to or higher than the dew point temperature of indoor air, and the air conditioner cools but does not dehumidify the indoor air.

Operation of Control Apparatus During Cooperative Operation

During cooperative operation of the air conditioning system (1), the control apparatus (40) operates to control operation of the air conditioners (10A to 10D). During such cooperative operation, one of the external control devices (42A to 42D) in the external control system (50) functions as a master control device whereas the remaining ones of the external control devices (42A to 42D) function as sub control devices. The one of the external control devices (42A to 42D) functioning as a master control device executes command generating operation to generate an operation command necessary for execution of cooperative operation. Operation of the control apparatus (40) during cooperative operation will be described below with reference to a flowchart in FIG. 5.

Figure 5:
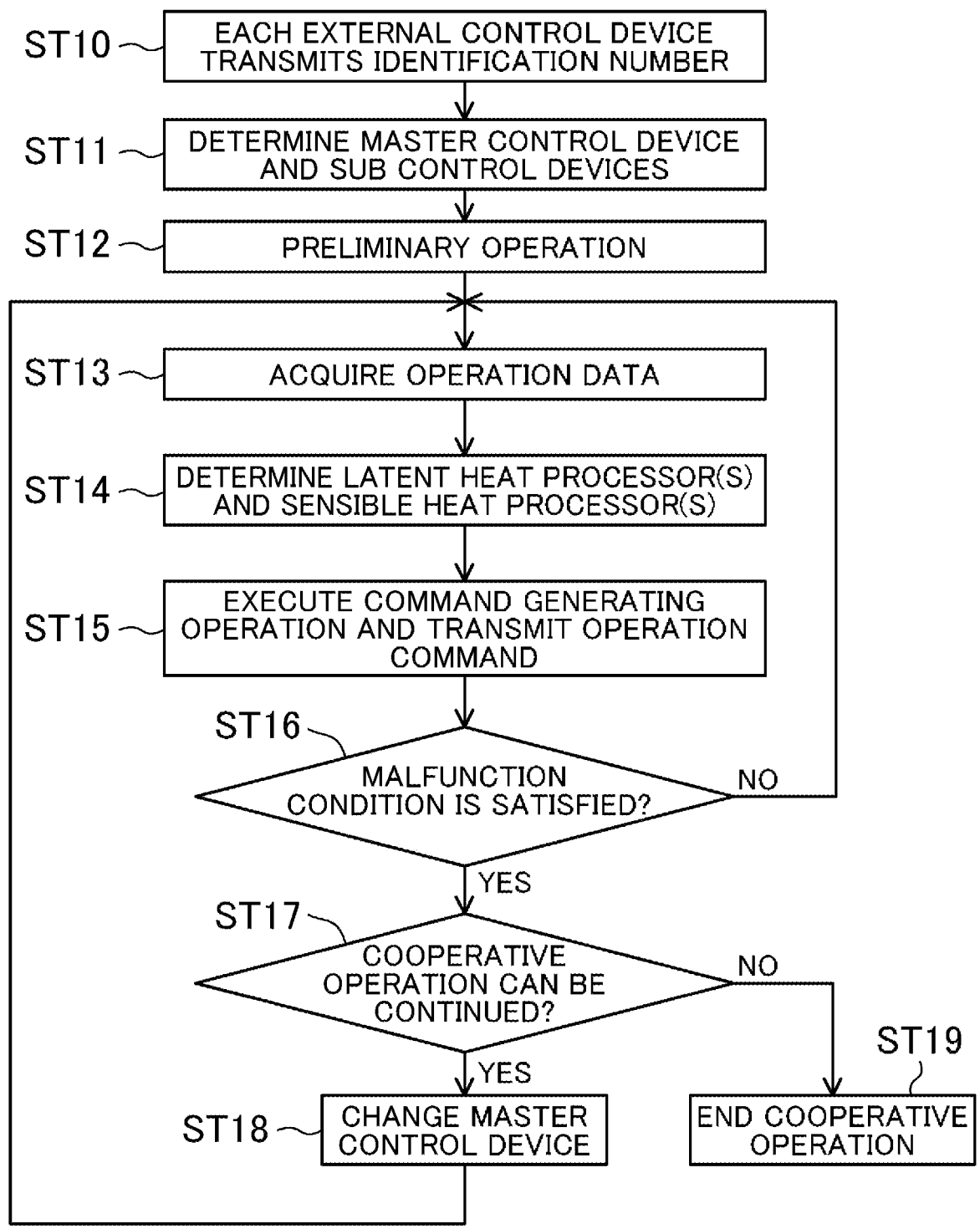
FIG. 5 is a flowchart depicting operation of a control apparatus.

When the user operates the communication terminal (44) to input a command to start cooperative operation, the control apparatus (40) starts the operation depicted in the flowchart in FIG. 5.

Step ST10

In step ST10, all the air conditioners (10A to 10D) provided in the air conditioning system (1) are powered on and all the external control devices (42A to 42D) are supplied with electric power. Every one of the external control devices (42A to 42D) constituting the external control system (50) transmits its own identification number stored therein to the remaining ones of the external control devices (42A to 42D).

Step ST11

In subsequent step ST11, the role determiner (52) in each of the external control devices (42A to 42D) determines whether the corresponding external control device operates as a master control device or a sub control device. Specifically, the role determiner (52) in each of the external control devices (42A to 42D) compares the stored own identification number with the identification numbers received from the remaining ones of the external control devices (42A to 42D). The role determiner (52) in each of the external control devices (42A to 42D) then determines to operate as a master control device when the own identification number is smaller than all the identification numbers received from the remaining ones of the external control devices (42A to 42D). The role determiner (52) in each of the external control devices (42A to 42D) determines to operate as a sub control device when any one of the identification numbers received from the remaining ones of the external control devices (42A to 42D) is smaller than the own identification number.

In the external control system (50) according to the present embodiment, the first external control device (42A) has the smallest identification number. Initially, the first external control device (42A) in the external control system (50) functions as a master control device whereas the second to fourth external control devices (42B to 42D) function as sub control devices.

Step ST12

In subsequent step ST12, the control apparatus (40) causes the air conditioning system (1) to execute preliminary operation. Such preliminary operation is executed to initially determine any of the air conditioners (10A to 10D) functioning as latent heat processors and any of the air conditioners (10A to 10D) functioning as sensible heat processors.

Specifically, in step ST12, the first external control device (42A) functioning as a master control device transmits, to the first internal control device (41A) and the second to fourth external control devices (42B, 42C, 42D), a cooling operation command signal to cause the air conditioners (10A to 10D) to execute cooling operation. Each of the second to fourth external control devices (42B, 42C, 42D) transmits the cooling operation command signal received from the first external control device (42A) to the corresponding one of the internal control devices (41B, 41C, 41D). Each of the internal control devices (41A to 41D) having received the cooling operation command signal causes the corresponding one of the air conditioners (10A to 10D) to execute cooling operation.

Step ST13

In subsequent step ST13, each of the external control devices (42A to 42D) acquires, from the corresponding one of the internal control devices (41A to 41D), operation data indicating an operating state of the corresponding one of the air conditioners (10A to 10D). Specifically, the first external control device (42A) acquires operation data of the first air conditioner (10A) from the first internal control device (41A), the second external control device (42B) acquires operation data of the second air conditioner (10B) from the second internal control device (41B), the third external control device (42C) acquires operation data of the third air conditioner (10C) from the third internal control device (41C), and the fourth external control device (42D) acquires operation data of the fourth air conditioner (10D) from the fourth internal control device (41D).

The operation data of each of the air conditioners (10A to 10D) includes a detection value of the suction temperature sensor (28), a detection value of the suction humidity sensor (29), a detection value of the refrigerant temperature sensor (30), an operating frequency of the compressor (21), and the like. In a case where any one of the air conditioners (10A to 10D) has trouble, the corresponding one of the internal control devices (41A to 41D) transmits, to the corresponding one of the external control devices (42A to 42D), an error code according to the ongoing trouble as the operation data.

Each of the external control devices (42A to 42D) transmits, to the remaining ones of the external control devices (42A to 42D), the operation data acquired from the corresponding one of the internal control devices (41A to 41D). In other words, irrespectively of whether functioning as a master control device or a sub control device, every one of the external control devices (42A to 42D) transmits the operation data thus acquired to the remaining ones of the external control devices (42A to 42D)

The external control devices (42A to 42D) each store the received operation data of the air conditioners (10A to 10D). Each of the external control devices (42A to 42D) further receives, from the communication terminal (44) via the wireless router (43), the set values, inputted by the user to the communication terminal (44), of temperature and humidity (set temperature and set humidity) of air in the indoor space (5). Each of the external control devices (42A to 42D) stores the set temperature and the set humidity thus acquired.

As described above, every one of the external control devices (42A to 42D) in the control apparatus (40) according to the present embodiment acquires, irrespectively of whether functioning as a master control device or a sub control device, operation data of all the air conditioners (10A to 10D) as well as the set temperature and the set humidity of the indoor space (5).

Step ST14

In subsequent step ST14, the one of the external control devices (42A to 42D) functioning as a master control device calculates a latent heat load and a sensible heat load of the indoor space (5) from the operation data of the air conditioners (10A to 10D) as well as the set temperature and the set humidity of the indoor space (5). The one of the external control devices (42A to 42D) functioning as a master control device then determines any of the air conditioners (10A to 10D) functioning as latent heat processors and any of the air conditioners (10A to 10D) functioning as sensible heat processors in accordance with the latent heat load and the sensible heat load of the indoor space (5) thus calculated.

Step ST15

In subsequent step ST15, the command generator (51) in the one of the external control devices (42A to 42D) functioning as a master control device executes command generating operation.

Specifically, the command generator (51) in the one of the external control devices (42A to 42D) functioning as a master control device calculates a target value (target evaporation temperature) of the evaporation temperature of the refrigerant in each of the air conditioners (10A to 10D) from the operation data of corresponding one of the air conditioners (10A to 10D) as well as the set temperature and the set humidity of the indoor space (5). In this case, the command generator (51) calculates, individually for the air conditioners (10A to 10D), the target evaporation temperature of each of the air conditioners (10A to 10D) such that the temperature and the humidity in the indoor space (5) reach the set values. The command generator (51) further sets the target evaporation temperature of any of the air conditioners (10A to 10D) functioning as latent heat processors to a value lower than the dew point temperature of indoor air, and sets the target evaporation temperature of any of the air conditioners (10A to 10D) functioning as sensible heat processors to a value equal to or higher than the dew point temperature of the indoor air.

The command generator (51) in the one of the external control devices (42A to 42D) functioning as a master control device outputs the target evaporation temperature thus calculated as an operation command to the corresponding one of the air conditioners (10A to 10D).

In an exemplary case where the first external control device (42A) functions as a master control device and the second to fourth external control devices (42B to 42D) function as sub control devices, the command generator (51) in the first external control device (42A) transmits the target evaporation temperature of the first air conditioner (10A) to the first internal control device (41A), transmits the target evaporation temperature of the second air conditioner (10B) to the second external control device (42B), transmits the target evaporation temperature of the third air conditioner (10C) to the third external control device (42C), and transmits the target evaporation temperature of the fourth air conditioner (10D) to the fourth external control device (42D).

In this case, the second to fourth external control devices (42B, 42C, 42D) functioning as sub control devices each transmit the target evaporation temperature to the corresponding one of the second to fourth internal control devices (41B, 41C, 41D). Specifically, the second external control device (42B) transmits the target evaporation temperature of the second air conditioner (10B) to the second internal control device (41B), the third external control device (42C) transmits the target evaporation temperature of the third air conditioner (10C) to the third internal control device (41C), and the fourth external control device (42D) transmits the target evaporation temperature of the fourth air conditioner (10D) to the fourth internal control device (41D).

Each of the internal control devices (41A to 41D) adjusts operating capacity of the compressor (21) in the corresponding one of the air conditioners (10A to 10D) in accordance with the target evaporation temperature thus received.

Step ST16

During cooperative operation, any of the external control devices (42A to 42D) functioning as sub control devices may fail to receive an operation command from the one of the external control devices (42A to 42D) functioning as a master control device. In view of this, in step ST16, each of the external control devices (42A to 42D) determines whether or not a malfunction condition is satisfied, indicating failure in receiving an operation command by the one of the external control devices (42A to 42D) functioning as sub control devices.

Examples of the malfunction condition include that "any of the external control devices (42A to 42D) functioning as sub control devices cannot receive operation data from the one of the external control devices (42A to 42D) functioning as a master control device for at least predetermined time (e.g. several minutes). This condition is satisfied in a case where communication trouble occurs between any of the external control devices (42A to 42D) functioning as sub control devices and the one of the external control devices (42A to 42D) functioning as a master control device, in a case where the user powers off the one of the air conditioners (10A to 10D) corresponding to the one of the external control devices (42A to 42D) functioning as a master control device and the one of the external control devices (42A to 42D) is not supplied with electric power, in a case where the one of the external control devices (42A to 42D) functioning as a master control device has trouble and cannot operate normally, or the like.

The examples of the malfunction condition further include that "any of the external control devices (42A to 42D) functioning as sub control devices receives, from the one of the external control devices (42A to 42D) functioning as a master control device, operation data including an error code indicating an inoperable state of the one of the air conditioners (10A to 10D) corresponding to the one of the external control devices (42A to 42D) functioning as a master control device". When this condition is satisfied, the one of the air conditioners (10A to 10D) corresponding to the one of the external control devices (42A to 42D) functioning as a master control device can be determined as being necessary to be excluded from cooperative operation targets.

In a case where the malfunction condition is not satisfied in step ST16, cooperative operation can be continued without changing the one of the external control devices (42A to 42D) functioning as a master control device or the ones of the external control devices (42A to 42D) functioning as sub control device. In this case, the operation flow thus returns to step ST13 and the control apparatus (40) repeats operation from step ST13 to step ST15. The control apparatus (40) repeats operation from step ST13 to step ST16 at intervals of several tens of seconds or the like.

In another case where the malfunction condition is satisfied in step ST16, it is necessary to exclude, from cooperative operation targets, the one of the air conditioners (10A to 10D) corresponding to the one of the external control devices (42A to 42D) having been functioning as a master control device for change of the one of the external control devices (42A to 42D) functioning as a master control device. The control apparatus (40) then executes operation in step ST17 in this case.

Step ST17

In step ST17, the ones of the external control devices (42A to 42D) having been functioning as sub control devices determine whether or not cooperative operation can be continued. Specifically, in a case where there is a plurality of air conditioners (10A to 10D) as cooperative operation targets, the ones of the external control devices (42A to 42D) determine that cooperative operation can be continued, and the operation flow proceeds to step ST18. In another case where there is only one of the air conditioners (10A to 10D) as a cooperative operation target, the ones of the external control devices (42A to 42D) determine that cooperative operation cannot be continued, and the operation flow proceeds to step ST19.

Step ST18

In step ST18, the ones of the external control devices (42A to 42D) having been functioning as sub control devices operate to switch one thereof to a master control device. Exemplarily described below is a case where the first external control device (42A) functions as a master control device and the second to fourth external control devices (42B, 42C, 42D) function as sub control devices upon execution of operation in step ST16.

If the malfunction condition is satisfied in step ST16 in this case, the first external control device (42A) is in a state of being incapable of functioning as a master control device. In view of this, each of the second to fourth external control devices (42B, 42C, 42D) transmits its own identification number stored therein to the remaining ones of the external control devices (42B, 42C, 42D) and executes operation same as operation in step ST11.

Specifically, the role determiner (52) in each of the second to fourth external control devices (42B, 42C, 42D) compares the stored own identification number with the identification numbers received from the remaining ones of the external control devices (42B, 42C, 42D). The role determiner (52) in each of the second to fourth external control devices (42B, 42C, 42D) then determines to operate as a master control device when the own identification number is smaller than all the identification numbers received from the remaining ones of the external control devices (42B, 42C, 42D). The role determiner (52) in each of the second to fourth external control devices (42B, 42C, 42D) determines to operate as a sub control device when any one of the identification numbers received from the remaining ones of the external control devices (42B, 42C, 42D) is smaller than the own identification number.

The second external control device (42B) has the smallest identification number in this exemplification. Accordingly in this exemplification, the second external control device (42B) switches from a sub control device to a master control device, and the third and fourth external control devices (42C and 42D) continuously function as sub control devices.

Upon determination of the external control device (42B) functioning as a master control device and the external control devices (42C and 42D) functioning as sub control devices, the operation flow returns to step ST13 and the control apparatus (40) repeats operation from step ST14 to step ST16.

In the above exemplification, the first air conditioner (10A) corresponding to the first external control device (42A) having become incapable of functioning as a master control device is excluded from cooperative operation targets. In a case where the first external control device (42A) cannot function as a master control device because of "failure of the first air conditioner (10A) corresponding to the first external control device (42A)", the first air conditioner (10A) stops operation. In another case where the first external control device (42A) cannot function as a master control device because of failure of the first external control device (42A) itself or the like, the first air conditioner (10A) corresponding to the first external control device (42A) is capable of operating normally. In this case, the first air conditioner (10A) thus executes operation having been executing before start of cooperative operation (e.g. cooling operation, heating operation, or blowing operation).

Step ST19

In step ST19, the control apparatus (40) ends cooperative operation of the air conditioning system (1). In this case, one of the air conditioners (10A to 10D) having been operating upon execution of operation in step ST17 continuously executes cooling operation.

Effects of Embodiment

The air conditioning system (1) according to the present embodiment includes the plurality of air conditioners (10A to 10D) each including the refrigerant circuit (20) configured to achieve the refrigeration cycle and a corresponding one of the internal control devices (41A to 41D) configured to control operation, and the external control devices (42A to 42D) provided one by one correspondingly to the plurality of air conditioners (10A to 10D) and each communicably connected to the one of the internal control devices (41A to 41D) in the corresponding one of the air conditioners (10A to 10D). Each of the external control devices (42A to 42D) is configured to execute command generating operation of individually generating an operation command to the corresponding one of the air conditioners (10A to 10D). Each of the internal control devices (41A to 41D) in the air conditioners (10A to 10D) is configured to control operation of the corresponding one of the air conditioners (10A to 10D) in accordance with the operation command received from the corresponding one of the external control devices (42A to 42D) connected to the one of the internal control devices (41A to 41D). The plurality of external control devices (42A to 42D) is configured to communicate with each other and constitutes the external control system (50). The external control system (50) is configured to cause one of the external control devices (42A to 42D) to function as a master control device configured to execute command generating operation and transmit an operation command generated through the command generating operation to the one of the internal control devices (41A to 41D) in the corresponding one of the air conditioners (10A to 10D) and the remaining ones of the external control devices (42A to 42D), and cause the remaining ones of the external control devices (42A to 42D) other than the one of the external control devices (42A to 42D) functioning as a master control device to each function as a sub control device configured to, without executing command generating operation, transmit the operation command received from the one of the external control devices (42A to 42D) functioning as a master control device to the one of the internal control devices (41A to 41D) in the corresponding air conditioner.

The air conditioning system (1) according to the first aspect includes the external control devices (42A to 42D) provided one by one correspondingly to the plurality of air conditioners (10A to 10D). In other words, the air conditioning system (1) includes the external control devices (42A to 42D) equal in the number thereof to the air conditioners (10A to 10D). The plurality of external control devices (42A to 42D) is configured to communicate with each other and constitutes the external control system (50).

In the external control system (50) according to the present embodiment, the one of the external control devices (42A to 42D) functions as a master control device whereas the ones other than the one of the external control devices (42A to 42D) functioning as a master control device function as sub control devices. All the ones other than the one of the external control devices (42A to 42D) functioning as a master control device do not need to function as sub control devices. For example, the ones other than the one of the external control devices (42A to 42D) functioning as a master control device may include at least one functioning as a sub control device and others being in an inactive state.

Each of the external control devices (42A to 42D) according to the present embodiment is configured to execute command generating operation. In other words, every one of the external control devices (42A to 42D) in the air conditioning system (1) according to the present embodiment can function as a master control device. In a case where any one of the external control devices (42A to 42D) cannot function as a master control device due to failure of the one of the external control devices (42A to 42D) or poor communication between any of the external control devices (42A to 42D), any remaining one of the external control devices (42A to 42D) can function as a master control device for continuous control of the air conditioners (10A to 10D) with use of operation commands. The present embodiment can thus achieve enhanced reliability of the air conditioning system (1).

In the air conditioning system (1) according to the present embodiment, upon satisfaction of a predetermined malfunction condition indicating that any of the external control devices (42A to 42D) functioning as sub control devices cannot receive the operation command, the external control system (50) is configured to cause one of the external control devices (42A to 42D) functioning as sub control devices to switch to a master control device and cause the one of the external control devices (42A to 42D) functioning as a master control device upon satisfaction of the malfunction condition and the remaining ones of the external control devices (42A to 42D) other than the one of the external control devices (42A to 42D) switched to a master control device due to satisfaction of the malfunction condition to function as sub control devices.

The external control system (50) according to the present embodiment determines whether or not the malfunction condition is satisfied. The malfunction condition is satisfied in an exemplary case where the one of the external control devices (42A to 42D) functioning as a master control device comes into a state of failing to execute command generating operation. Examples of a cause of such a state include "failure of the one of the external control devices (42A to 42D) functioning as a master control device", "failure of the one of the air conditioners (10A to 10D) corresponding to the one of the external control devices (42A to 42D) functioning as a master control device", and "a power off state of the one of the air conditioners (10A to 10D) corresponding to the one of the external control devices (42A to 42D) functioning as a master control device". Such a state is effective also in a case where the one of the external control devices (42A to 42D) functioning as a master control device cannot collect data or the like necessary for execution of command generating operation. The malfunction condition is satisfied also in an exemplary state where the one of the external control devices (42A to 42D) functioning as a master control device can execute command generating operation but an operation command outputted from the one of the external control devices (42A to 42D) functioning as a master control device does not reach any one of the external control devices (42A to 42D) functioning as sub control devices. Examples of a cause of such a state include "failure of communication lines connecting the external control devices (42A to 42D)".

When the malfunction condition is satisfied in the external control system (50) according to the present embodiment, each of the external control devices (42A to 42D) functioning as sub control devices cannot receive the operation command and thus cannot transmit the operation command to the internal control devices (41A to 41D) in the air conditioners (10A to 10D).

The external control system (50) according to the present embodiment is thus configured to change the one of the external control devices (42A to 42D) functioning as a master control device upon satisfaction of the malfunction condition. One of the external control devices (42A to 42D) functioning as sub control devices upon satisfaction of the malfunction condition then executes command generating operation in place of the master control device and transmits operation commands generated through the command generating operation to the remaining ones of the external control devices (42A to 42D). The present embodiment thus achieves continuous control of the air conditioners (10A to 10D) with use of operation commands even upon satisfaction of the malfunction condition, for enhanced reliability of the air conditioning system (1).

In the external control system (50) according to the present embodiment, each of the external control devices (42A to 42D) is configured to store the unique identification number. The external control system (50) is configured to cause one storing the smallest one of the identification numbers out of the external control devices (42A to 42D)

functioning as the sub control devices upon satisfaction of the malfunction condition to switch to a master control device.

When the malfunction condition is satisfied in the external control system (50) according to the present embodiment, one storing the smallest one of the identification numbers out of the external control devices (42A to 42D) functioning as sub control devices upon satisfaction of the malfunction condition switches to a master control device and executes command generating operation.

In the external control system (50) according to the present embodiment, each of the external control devices (42A to 42D) is configured to acquire operation data indicating an operating state of the corresponding one of the air conditioners (10A to 10D) from the one of the internal control devices (41A to 41D) in the corresponding one of the air conditioners (10A to 10D), transmit the operation data thus acquired to the remaining ones of the external control devices (42A to 42D), and execute, when functioning as a master control device, command generating operation with use of the operation data acquired from the one of the internal control devices (41A to 41D) in the corresponding one of the air conditioners (10A to 10D) and the operation data received from the ones of the external control devices (42A to 42D) functioning as sub control devices.

In the external control system (50) according to the present embodiment, the ones of the external control devices (42A to 42D) functioning as sub control devices as well as the one of the external control devices (42A to 42D) functioning as a master control device acquire the operation data from the one of the internal control devices (41A to 41D) in the corresponding one of the air conditioners (10A to 10D) and transmit the operation data thus acquired to the remaining ones of the external control devices (42A to 42D). In a case where any one of the external control devices (42A to 42D) constituting the external control system (50) functions as a master control device, the one of the external control devices (42A to 42D) functioning as a master control device can thus receive operation data from the ones of the external control devices (42A to 42D) functioning as sub control devices. Each of the external control devices (42A to 42D) constituting the external control system (50) generates, when functioning as a master control device, operation commands to the air conditioners (10A to 10D) with use of the operation data acquired to the one of the internal control devices (41A to 41D) in the corresponding one of the air conditioners (10A to 10D) and the operation data received from the ones of the external control devices (42A to 42D) functioning as sub control devices.

In the external control system (50) according to the present embodiment, each of the external control devices (42A to 42D) includes the communication unit (46) configured to transmit and receive information by means of wireless communication, to achieve wireless communication between the one of the external control devices (42A to 42D) functioning as a master control device and the ones of the external control devices (42A to 42D) functioning as sub control devices.

In the external control system (50) according to the present embodiment, the one of the external control devices (42A to 42D) functions as a master control device and the ones of the external control devices (42A to 42D) functioning as sub control devices wirelessly transmit and receive information such as operation commands and data. There is thus no need to provide any communication cable or the like in order to connect the external control devices (42A to 42D), achieving simplification in configuration of the external control system (50) as well as reduction in manhour necessary for installation of the external control system (50).

Modification Examples of Embodiment

Description is made to the air conditioning system (1) according to each of the modification examples of the embodiment described above.

First Modification Example

In the air conditioning system (1) according to the above embodiment, when the user operates the communication terminal (44) to input a command to start cooperative operation, all the air conditioners (10A to 10D) provided in the air conditioning system (1) are powered on and all the external control devices (42A to 42D) are supplied with electric power (see step ST10 in FIG. 5). When the user operates the communication terminal (44) to input the command to start cooperative operation, the control apparatus (40) in the air conditioning system (1) according to the above embodiment is configured to start the cooperative operation, assuming all the air conditioners (10A to 10D) as targets.

The control apparatus (40) in the air conditioning system (1) may alternatively be configured to start cooperative operation, assuming only those of the air conditioners (10A to 10D) operating when the user operates the communication terminal (44) to input the command to start the cooperative operation. In an exemplary case where the user inputs the command to start cooperative operation in a state where the first to third air conditioners (10A to 10C) are in operation and the fourth air conditioner (10D) is stopped, the control apparatus (40) according to the present modification example starts the cooperative operation, assuming only the first to third air conditioners (10A to 10C) as targets.

If only one of the air conditioners (10A to 10D) is in operation when the user inputs the command to start cooperative operation, the control apparatus (40) according to the present modification example determines that the cooperative operation is unexecutable. In this case, the control apparatus (40) according to the present modification example notifies the user, through display on the remote controller (15) or the like, of unexecutability of the cooperative operation.

Second Modification example

The control apparatus (40) in the air conditioning system (1) according to the above embodiment may alternatively be configured to determine, during test operation subsequent to installation, one of the external control devices (42A to 42D) functioning as a master control device and ones of the external control devices (42A to 42D) functioning as sub control devices and cause the one of the external control devices (42A to 42D) functioning as a master control device or the like to store a result thereof.

Assume that, during such test operation, the first external control device (42A) is determined to function as a master control device and the remaining second to fourth external control devices (42B to 42D) are determined to function as sub control devices. In this case, when the user operates the communication terminal (44) and inputs the command to start cooperative operation, the control apparatus (40) according to the present modification example executes operation depicted in the flowchart in FIG. 5. Note that the control apparatus (40) according to the present modification example skips operation in step ST10 and step ST11 in FIG. 5, and executes operation in step ST12 assuming that the first external control device (42) functions as a master control device and the remaining second to fourth control devices (42B to 42D) function as sub control devices.

The embodiment and the modification examples have been described above. Various modifications to modes and details will be apparently available without departing from the object and the scope of the claims. The embodiment and the modification examples may be combined or replaced appropriately unless affecting the functions of the present disclosure.

INDUSTRIAL APPLICABILITY

As described above, the present disclosure is useful in an air conditioning system.

EXPLANATION OF REFERENCES

1 Air conditioning system
10A, 10B, 10C, 10D Air conditioner
20 Refrigerant circuit
40 Control apparatus
41A, 41B, 41C, 41D Internal control device
42A, 42B, 42C, 42D External control device
46 Communication unit
50 External control system

The invention claimed is:

1. An air conditioning system comprising:
air conditioners each including a refrigerant circuit configured to achieve a refrigeration cycle and a corresponding one of internal controllers configured to control operation; and
external controllers provided one by one correspondingly to the air conditioners and each communicably connected to one of the internal controllers in a corresponding one of the air conditioners, wherein
each of the external controllers is configured to execute a command generating operation of individually generating an operation command to the corresponding one of the air conditioners,
each of the internal controllers in each of the air conditioners is configured to control operation of a corresponding one of the air conditioners in accordance with the operation command received from one of the external controllers connected to the corresponding one of the internal controllers,
the external controllers are configured to communicate with each other to constitute an external control system,
the external control system is configured to
cause one of the external controllers to function as a master controller configured to execute the command generating operation and transmit the operation command generated through the command generating operation to the corresponding one of the internal controllers in the corresponding one of the air conditioners and remaining ones of the external controllers, and
cause the remaining ones of the external controllers, other than the one of the external controllers functioning as the master controller, to function as sub controllers, each configured to, without executing the command generating operation, transmit the operation command received from the one of the external controllers functioning as the master controller to the corresponding one of the internal controllers in the corresponding one of air conditioners,
the external control system is further configured to,
upon satisfaction of a predetermined malfunction condition indicating that any of the external controllers functioning as the sub controllers cannot receive the operation command,
cause one of the external controllers functioning as the sub controllers to switch to become the master controller, and
cause remaining ones of the external controllers, other than the one of the external controllers functioning as the master controller upon satisfaction of the malfunction condition and the one of the external controllers switched to the master controller due to satisfaction of the malfunction condition, to remain functioning as the sub-controllers, and
cause the switched master controller to execute the command generating operation and transmit the operation command generated through the command generating operation to the remaining ones of the external controllers functioning as the sub controllers, and
cause each of the remaining ones of the external controllers functioning as the sub controllers to transmit the operation command received to the corresponding one of the internal controllers in the corresponding one of air conditioners, wherein
each of the external controllers functioning as the sub controllers is configured to determine whether or not the malfunction condition is satisfied.

2. The air conditioning system according to claim 1, wherein
the external controllers are configured to store unique identification numbers, and
the external control system is configured to cause one storing a smallest one of the identification numbers out of the external controllers functioning as the sub controllers, upon satisfaction of the malfunction condition, to switch to become the master controller.

3. The air conditioning system according to claim 1, wherein
each of the external controllers is configured to
acquire operation data indicating an operating state of the corresponding one of the air conditioners from the corresponding one of the internal controllers in the corresponding one of the air conditioners, transmit the operation data thus acquired to the remaining ones of the external controllers, and
execute, when functioning as the master controller, the command generating operation with use of the operation data acquired from the corresponding one of the internal controllers in the corresponding one of the air conditioners and the operation data received from the external controllers functioning as the sub-controllers.

4. The air conditioning system according to claim 1, wherein
in the external control system, each of the external controllers transmits and receives information via wireless communication, to achieve wireless communication between the one of the external controllers functioning as the master controller and the external controllers functioning as the sub-controllers.

5. The air conditioning system according to claim 2, wherein
each of the external controllers is configured to
acquire operation data indicating an operating state of the corresponding one of the air conditioners from the corresponding one of the internal controllers in the corresponding one of the air conditioners, transmit the operation data thus acquired to the remaining ones of the external controllers, and
execute, when functioning as the master controller, the command generating operation with use of the operation data acquired from the corresponding one of the internal controllers in the corresponding one of the air conditioners and the operation data received from the external controllers functioning as the sub-controllers.

6. The air conditioning system according to claim 2, wherein
each of the external controllers is configured to
transmit a corresponding identification number to the remaining ones of the external controllers upon the malfunction condition being satisfied, and
compare the corresponding identification number with the identification numbers received from the remaining ones of the external controllers to determine whether to operate as the master controller or as one of the sub controllers.

* * * * *